United States Patent
Morgante

(10) Patent No.: US 12,539,581 B2
(45) Date of Patent: Feb. 3, 2026

(54) APPARATUS TO BE DETACHABLY FIXED ON A MOUNTED GLAZING PANEL AND ASSOCIATED METHOD

(71) Applicants: AGC GLASS EUROPE, Louvain-la-neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventor: Eric Morgante, Gosselies (BE)

(73) Assignees: AGC GLASS EUROPE, Louvain-la-neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(*) Notice: Subject to any disclaimer, the term of this patent is extended or adjusted under 35 U.S.C. 154(b) by 612 days.

(21) Appl. No.: 17/904,564

(22) PCT Filed: Feb. 5, 2021

(86) PCT No.: PCT/EP2021/052875
§ 371 (c)(1),
(2) Date: Aug. 18, 2022

(87) PCT Pub. No.: WO2021/165065
PCT Pub. Date: Aug. 26, 2021

(65) Prior Publication Data
US 2023/0085851 A1  Mar. 23, 2023

(30) Foreign Application Priority Data
Feb. 20, 2020  (EP) ................................ 20158585

(51) Int. Cl.
B25B 11/00 (2006.01)
E06B 3/54 (2006.01)

(52) U.S. Cl.
CPC .............. *B25B 11/005* (2013.01); *E06B 3/54* (2013.01)

(58) Field of Classification Search
CPC ....... B25B 11/005; B25B 11/00; B23Q 3/088; B23Q 3/067; B23Q 3/068
See application file for complete search history.

(56) References Cited

U.S. PATENT DOCUMENTS 3,742,802 A * 7/1973 Maerz .................... B26D 7/018
269/21
5,383,751 A   1/1995 Wheetley et al.
(Continued)

FOREIGN PATENT DOCUMENTS

| EP | 3 369 525 A1 | 9/2018 |
| WO | WO 2013/039915 A1 | 3/2013 |
| WO | WO 2015/050762 A1 | 4/2015 |

OTHER PUBLICATIONS

International Search Report issued Apr. 23, 2021, in PCT/EP2021/052875 filed Feb. 5, 2021, 4 pages.

*Primary Examiner* — Lee D Wilson
(74) *Attorney, Agent, or Firm* — Oblon, McClelland, Maier & Neustadt, L.L.P.

(57) ABSTRACT

An apparatus detachably fixed on a glazing panel mounted on a stationary or mobile object, the apparatus includes a fixing frame having a fixing frame plane, FFplane, a functional device, a first motor to move the functional device in a first direction, and a second motor to move the functional device in a second direction. The apparatus has at least N suction devices, including a suction end, detachably fixed to the glazing panel, defining a resting distance, Drest, between the FFplane and the suction end, and defining a working (Continued)

distance, Dwork, between the FFplane and the suction end, and at least M rigid pushing devices, including a pushing end defining a pushing distance, Dpush, between the FFplane and the pushing end, where the sum of the positive integers M and N is equal to or greater than 3 and where Dpush is equal to or greater than Dwork.

13 Claims, 7 Drawing Sheets

(56) References Cited

U.S. PATENT DOCUMENTS

| | | | |
|---|---|---|---|
| 8,172,210 B2* | 5/2012 | Jeon | B25J 15/0061 |
| | | | 269/21 |
| 8,927,069 B1 | 1/2015 | Estinto et al. | |
| 2006/0062265 A1 | 3/2006 | Denney et al. | |
| 2008/0240178 A1 | 10/2008 | Denney et al. | |
| 2013/0092679 A1 | 4/2013 | Rozbicki et al. | |
| 2014/0115894 A1* | 5/2014 | Gamboa | B60V 1/043 |
| | | | 269/21 |
| 2014/0353894 A1* | 12/2014 | DesJardien | B23Q 1/035 |
| | | | 269/21 |
| 2015/0093466 A1 | 4/2015 | Estinto et al. | |
| 2015/0093554 A1 | 4/2015 | Estinto et al. | |
| 2017/0044057 A1 | 2/2017 | Rozbicki et al. | |
| 2018/0036839 A1 | 2/2018 | Estinto et al. | |
| 2018/0250833 A1 | 9/2018 | Boria et al. | |
| 2023/0294229 A1* | 9/2023 | Feng | B25B 11/005 |
| | | | 29/458 |

* cited by examiner

APPARATUS TO BE DETACHABLY FIXED ON A MOUNTED GLAZING PANEL AND ASSOCIATED METHOD

TECHNICAL FIELD

The present invention relates to apparatus configured to be detachably fixed on a glazing panel mounted on a stationary object, such as a building, or on a mobile object such as a vehicle or a train.

BACKGROUND ART

Openings in a stationary object or in a mobile object can be closed by glazing panel in order to have a visual interactions between indoor and outdoor.

Generally, glazing panels are mounted for a long period of time, for example more than 20 years in a building or for the lifetime for a train.

Modifying at least one interface of such mounted glazing panels needs to change the whole glazing panel. Changing glazing panel needs a lot of handling, a lot of time, costs a lot of money and it is not environmental friendly.

Interfaces of glazing panel are main surfaces of glazing panels regarded as the common boundary of two bodies, spaces, or phases.

To improve the transmittance of said glazing panel, WO 2015/050762 describes an apparatus comprising a laser light source and a lens array configured to focus said laser light source on a coating system of a multi-glazed window. Said apparatus is mounted on suction pads to secure said apparatus on said glazing panel, composed of two glass sheets separated by an spacer and where one of the two glass sheets has a coating system on it. Said apparatus also comprises at least two motors configured to move said laser along rails along the X and Y axis. Said laser is capable of scribing a grid shape on said coating system to improve the electromagnetic transmission of said multi-glazed window.

A coating system can be applied on the surface of one or several glass panels inside a multi-glazed window in order to further improve the multi-glazed window properties.

This coating system can either improve the multi-glazed window insulation, reduce the amount of infrared and/or ultraviolet radiation entering the multi-glazed window or keep the sun's heat out of a space.

This kind of apparatus are not stable due to its own weight and movement of motors. Due to this instability, the precision of the modification of the interface is not enough.

WO 2015/050762 can adapt the speed of motors in order to minimize dynamic shocks due to the movement of the system driven by motors. This does not solve the issue especially the lack of precision due to its own weight and the movement of the apparatus due to dynamics movements of motors.

SUMMARY OF INVENTION

It is an object of the present invention to alleviate these problems and especially the precision issues for apparatus able to be mounted on glazing panels in situ.

According to a first aspect of the invention, the invention relates to an improved an apparatus configured to be detachably fixed on a glazing panel mounted on a stationary object, such as building, or on a mobile object, such as vehicle, train, . . . ; the apparatus comprising:

A fixing frame having a fixing frame plane, FFplane, defined by a longitudinal axis X and a transversal axis Y A functional device At least a first motor configured to move said functional device in a first direction essentially parallel to FFplane.

The solution as defined in the first aspect of the present invention is based on the said apparatus comprises:

At least N suction means, wherein N is a positive integer (N>0), comprising
   a suction end, detachably fixed to said glazing panel,
      defining a resting distance, Drest, between the FFplane and the suction end, measured in the direction normal to FFPlane, when said apparatus is not fixed to said glazing panel
      defining a working distance, Dwork, between the FFplane and the suction end, measured in the direction normal to FFPlane, when said apparatus is detachably fixed to said glazing panel at least M rigid pushing means, wherein M is a positive integer (M>0), comprising
   a pushing end defining a pushing distance, Dpush, between the FFplane and the pushing end, measured in the direction normal to FFPlane.

FFplane is substantially parallel to said glazing panel.

According to the invention, the sum of the positive integers M and N is equal to or greater than 3 (M+N≥3) and Dpush is equal to or greater than Dwork (Dpush≥Dwork).

According to some embodiments, said pushing distance Dpush is greater than or equals to the sum of said working distance Dwork and at least a lower coefficient xpl of the difference between said resting distance Drest and working distance Dwork (Dpush≥Dwork+xpl (Drest−Dwork)) wherein 0.1≤xpl≤0.5; preferably, 0.3≤xpl≤0.5; more preferably, 0.4≤xpl≤0.5 in order to ensure an optimisation between the stability of said apparatus and detachably fixation of said suction means.

According to some embodiments, said pushing distance Dpush is smaller than or equals to the difference between said resting distance Drest and at least an upper coefficient xpu of the difference between said resting distance Drest and working distance Dwork (Dpush≤Drest−xpu (Drest−Dwork)) wherein 0.1≤xpu≤0.5; preferably, 0.3≤xpu≤0.5; more preferably, 0.4≤xpu≤0.5 in order to ensure an optimisation between the stability of said apparatus and detachably fixation of said suction means.

According to some embodiments, said functional device is a painting machine able to applied a paint, a lacquer, or any suitable wet coating able to be applied on a surface of a glazing panel.

In glazing panels for buildings and automotive applications, antennas for reception and, or transmission of radio frequency (RF) waves are commonly incorporated. These may be realized as, for example, conductive films deposited on the glazing or metal wires or strips attached thereto. In laminated glazings, which typically comprise two or more glass sheets bonded by a polymeric interlayer, the antennas might be located within the laminate i.e. within the interlayer or on a glass surface contacting the interlayer.

In addition, in many cases additional equipment is operated within the vehicle or the building, which radiates and/or receives radiofrequency signals. To ensure function of this equipment, sufficient transmittance through the glazing is necessary.

Although glazing unit, particularly for automotive applications, are predominantly formed in glass, other materials such as polycarbonates are known and references to glass throughout this application should not be regarded as limiting.

In order to reduce the accumulation of heat in the interior of a building or vehicle, a glazing unit may be coated with a coating system, for example a solar control coating system, that absorbs or reflects solar energy. Inclusion of solar control films, particularly on glazings for use in warm, sunny climates, is desirable because they reduce the need for air conditioning or other temperature regulation methods. This affords savings in terms of energy consumption and environmental impact.

Such coating systems, however, are typically electrically conductive and are high in reflectance for RF radiation. This effect impedes reception or transmission by antennas.

This makes the coating systems efficient reflectors of broad bands of radio frequency signals. Furthermore, commercial construction, automotive, train, . . . tend to use other materials that further block RF signals. Materials such as concrete, brick, mortar, steel, aluminum, roofing tar, gypsum wall board, and some types of wood all offer varying degrees of RF absorption. The result is that many newer constructions severely impede RF signals from getting into or out of the buildings.

Nonetheless, RF devices have become an important part of modern life, especially with the huge penetration of cellular smartphones, tablets, IoT (Internet of Things) devices, that are requiring a deep penetration in the buildings or automotive of electromagnetic field for indoor coverage, even at high spectrum frequencies up to 30-40 GHz. Such devices may include cellular transceivers, wireless local area network ("Wi-Fi") transceivers, Global Positioning System (GPS) receivers, Bluetooth transceivers and, in some cases, other RF receivers (e.g., FM/AM radio, UHF, etc.). As the popularity of such devices has grown, the importance of being able to use RF-based features within the confines of modern commercial buildings has grown.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to have a wide band frequency selective surface in order to ensure the transmission of waves with different frequencies through the glazing unit.

The ITU IMT-2020 specification demands speeds up to 20 Gbps, achievable with wide channel bandwidths and massive MIMO 3rd Generation Partnership Project (3GPP) is going to submit 5G NR (New Radio) as its 5G communication standard proposal. 5G NR can include lower frequencies, below 6 GHz, and mmWave, above 15 GHz. However, the speeds and latency in early deployments, using 5G NR software on 4G hardware (non-standalone), are only slightly better than new 4G systems, estimated at 15% to 50% better. On top of that, IoT will requires indoor coverage as better as possible not for massive MTC (Machine Type Communication) but for critical MTC where robots or industrial devices are 5G wireless remotely controlled.

According to some embodiments, the device is a decoating means configured to modify at least one coating system applied on an interface of the glazing panel. These embodiments permit to remove a portion of a coating system, for instance to improve the electromagnetic transmission of a multi-glazed window. Moreover, the invention provides a focusing of said decoating means on said coating system even if the structure of said multi-glazed window is unknown. Thus, the apparatus of the invention can be used to improve the electromagnetic properties of a multi-glazed window already mounted on a structure, for instance a building or a vehicle. These embodiments permits to remove a portion of a coating system, for instance to improve the electromagnetic transmission of a glazing panel. Moreover, the invention provides a focusing of said decoating means on said coating system even if the structure of said glazing panel is unknown. Thus, the apparatus of the invention can be used to improve the electromagnetic properties of a glazing panel already mounted on a structure, for instance a building or a vehicle. Indeed, to work correctly, the laser source of a decoating system must be positioned at a sufficient distance from the glazing panel in order to avoid any degradation during the movements of the decoating means.

In order to improve the transmittance of a multi-glazed window containing a coating system, it is possible to use a laser decoating system. Said laser decoating system removes at least one portion of the coating system. The total decoated surface must be between 1 and 3% of the total coating system surface in order to both improve the transmission of radio waves through the multi-glazed-window and preserve the properties of said coating system.

Preferably, to improve the transmission of a radio wave through the window, the decoating system will remove segments from the coating system and the sum of the longest sub-segment of each segment is equal to $n\lambda/2$ wherein n is a positive integer greater than zero and lambda ($\lambda$) is the wavelength of the radio wave. It is necessary to have a wide band frequency selective surface in order to ensure the transmission of waves with different frequencies through the multi-glazed window. Typically between 2 GHz and 60 Ghz. For instance, the decoating system can be configured to remove a segment of a length greater than 400 mm and a width between 10 and 100 μm.

According to some embodiments, said suction end is a vacuum pad or a suction cup in order to be detachably fixed on a surface of the glazing panel.

According to some embodiments, said frame comprises at least a first rail and a second rail, said first rail allowing said device to move in the first direction, the second rail allowing said device to move in the second direction.

According to some embodiments, said pushing end comprises a soft material configured to be in contact with said glazing panel to avoid to damage the surface of the glazing panel. Said soft material can be chosen to avoid shear forces between the apparatus and said surface.

According to some embodiments, wherein said pushing end comprises at least two fingers configured to be in contact with said glazing panel. And in some other embodiments, said pushing end is a base to maximize the surface of contact with the surface of said glazing panel.

The present invention concerns also a method to mount said apparatus on a glazing panel of a stationary object or on a mobile object, said method comprises following steps:
  Placing the suction end of at least one of said suction
    means against one surface of said glazing panel to have
    a distance between FFplane and said surface substantially equals to Drest,
  Detachably fixing said suction end to said surface of said
    glazing panel
  The solution as defined is based on the said method that during said detachably fixing step, pushing end touch said glazing panel and push the glazing panel to have Dpush equals to or greater than Dwork (Dpush≥Dwork).

The present invention also concerns the use of said apparatus to be detachably fixed on a glazing panel mounted on a stationary object or on a mobile object to modify at least a part of one interface of said glazing panel.

It is noted that the invention relates to all possible combinations of features recited in the claims or in the described embodiments.

The following description relates to an building window unit but it's understood that the invention may be applicable to others fields like automotive or transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
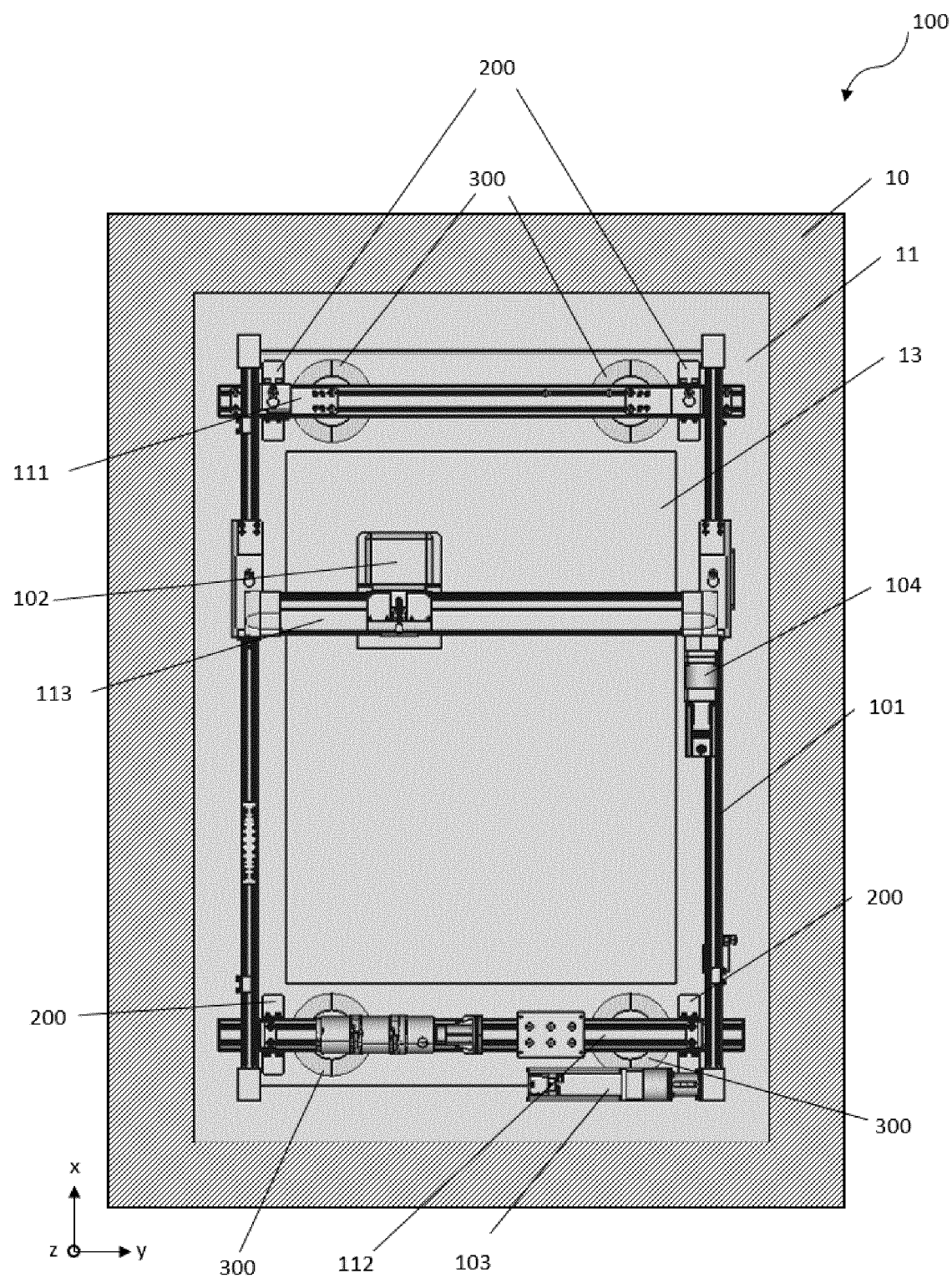
FIG. 1 is a schematic front view of an apparatus detachably fixed on a glazing panel mounted on a stationary object according to an exemplifying embodiment of the present invention.
Figure 2:
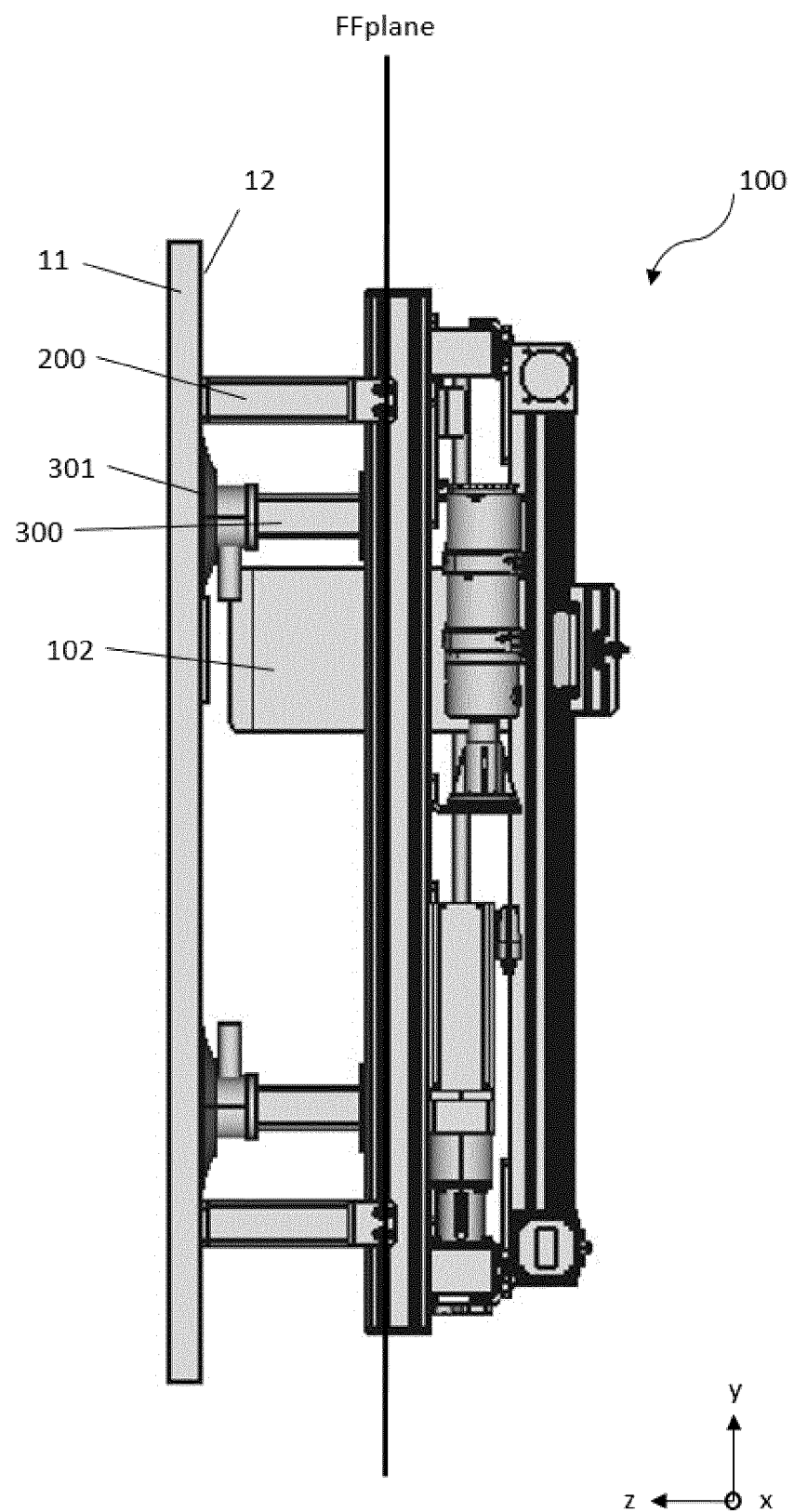
FIGS. 2 and 3 are schematic side views from the top of an apparatus detachably fixed on a glazing panel mounted on a stationary object according to an exemplifying embodiment of the present invention.
Figure 3:
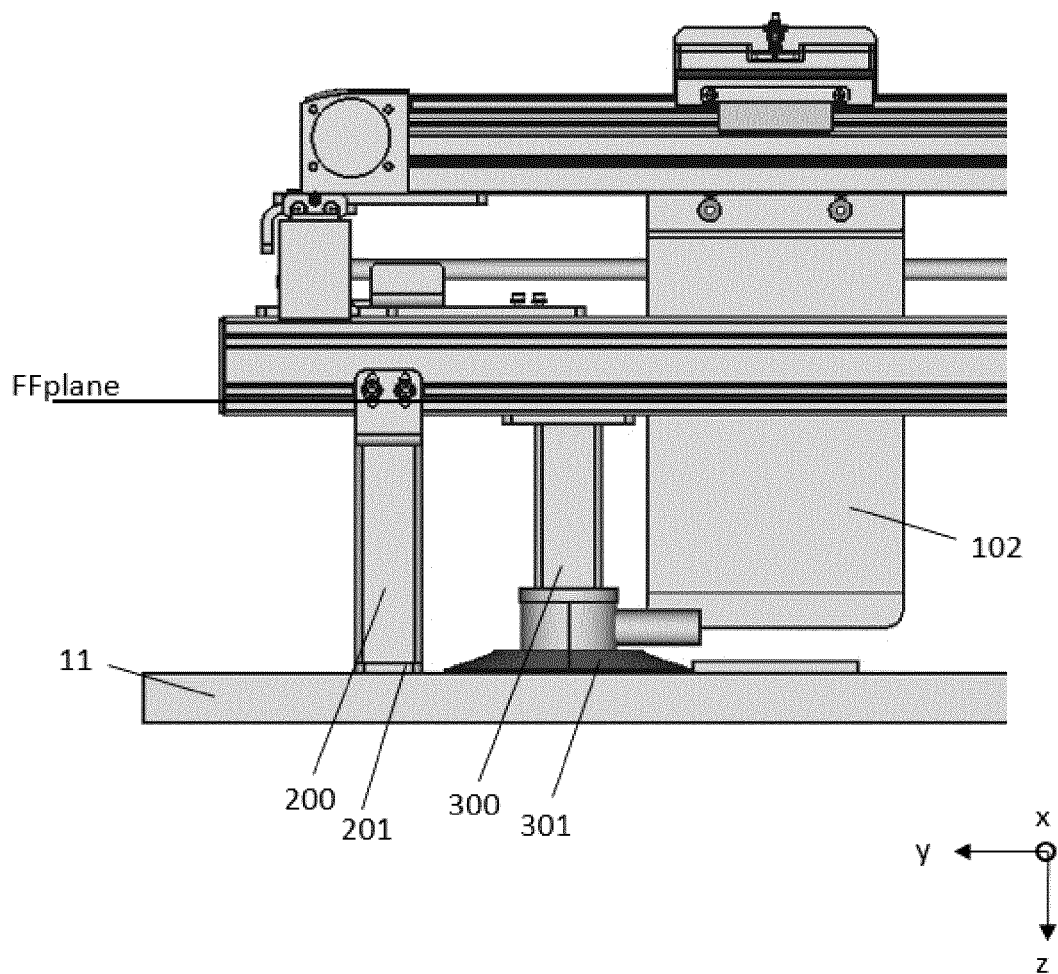
Figure 4:
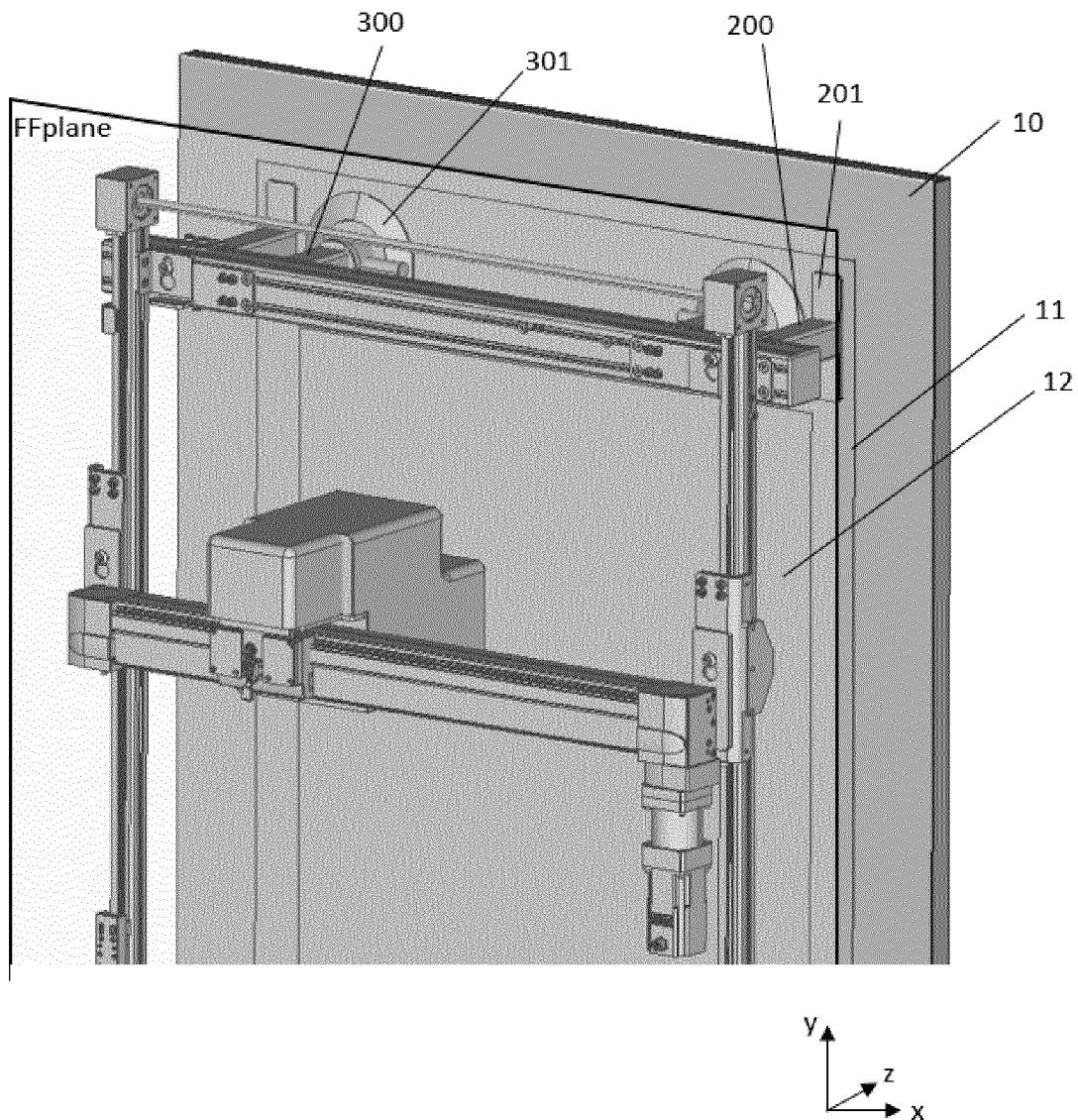
FIG. 4 is a schematic 3D view of an apparatus detachably fixed on a glazing panel mounted on a stationary object according to an exemplifying embodiment of the present invention.

For a better understanding, the scale of each member in the drawing may be different from the actual scale. In the present specification, a three-dimensional orthogonal coordinate system in three axial directions (X axis direction, Y axis direction, Z axis direction) is used, the longitudinal direction of the apparatus is defined as the X direction, the transversal direction is defined as the Y direction, and the height is defined as the Z direction. The direction from said apparatus to said glazing panel is defined as the +Z axis direction, and the opposite direction is defined as the −Z axis direction.

With reference to FIGS. 1-5, a first embodiment of the present invention is described.

As shown in FIGS. 1-5, according to the invention, an apparatus 100 is detachably fixed on a glazing panel 11 mounted on a stationary object 10 or on a mobile object 10 means that the glazing panel is in situ.

Said apparatus is fixed on a substantially vertical glazing panel meaning that +X is upper than −X. The weight of the apparatus creates forces in −X.

The glazing panel 11 can be a glazing panel used as a window to close an opening of a stationary object 10 such as building or to close an opening of a mobile object 10 such as a vehicle, a train, . . .

Said glazing panel 11 can be at least transparent for visible waves in order to see-through and to let natural or artificial light passing through. Said glazing panel can be a single sheet or multiple sheets alternatively separated by at least one interlayer, such as a gas-filled or a polymeric foil, forming multiple interfaces. The glazing panel 11 can comprise at least two glass sheets separated by a spacer allowing to create a space filled by a gas like Argon to improve the thermal isolation of the glass panel, creating an insulating glazing panel.

Such glazing panel can be made of glass sheets, polycarbonate, PVC or any other material used as a window mounted on a stationary object or on a mobile object.

In another embodiment, the glass panel can be a laminated glass panel to reduce the noise and/or to ensure the penetration safety. The laminated glazing comprises glass panels maintained by one or more interlayers positioned between glass panels. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

As the material of the glazing panel 11, for example, soda-lime silica glass, borosilicate glass, or aluminosilicate glass can be mentioned or other materials such as thermoplastic polymers, polycarbonates are known, especially for automotive applications, and references to glass throughout this application should not be regarded as limiting.

The glazing panel 11 can be manufactured by a known manufacturing method such as a float method, a fusion method, a redraw method, a press molding method, or a pulling method. As a manufacturing method of the glazing panel 11, from the viewpoint of productivity and cost, it is preferable to use the float method.

The glazing panel 11 can be flat or curved according to requirements by known methods such as hot or cold bending.

The glazing panel 11 can be processed, ie annealed, tempered, . . . to respect with the specifications of security and anti-thief requirements.

The glass sheet can be a clear glass or a colored glass, tinted with a specific composition of the glass or by applying an additional coating or a plastic layer for example.

The glazing panel 11 can be formed in a rectangular shape in a plan view by using a known cutting method. As a method of cutting the glazing panel 11 , for example, a method in which laser light is irradiated on the surface of the glazing panel 11 to cut the irradiated region of the laser light on the surface of the glazing panel 11 to cut the glass panel 21, or a method in which a cutter wheel is mechanically cutting can be used. The glass panel can have any shape in order to fit with the application, for example a windshield, a sidelite, a sunroof of an automotive, a lateral glazing of a train, a window of a building, . . .

In the present embodiment, the shape of the glazing panels is rectangular. Rectangle includes not only a rectangle or a square but also a shape obtained by chamfering corners of a rectangle or a square. The shape of the glazing panel 11 in a plan view is not limited to a rectangle, and may be a circle or the like.

In addition, the glazing unit 10 can be assembled within a frame or be mounted in a double skin façade, in a carbody or any other means able to maintain a glazing unit. Some plastics elements can be fixed on the glazing panel to ensure the tightness to gas and/or liquid, to ensure the fixation of the glazing panel or to add external element to the glazing panel.

In case of several glass sheets, in some embodiments, each glass sheet can be independently processed and/or colored, . . . in order to improve the aesthetic, thermal insulation performances, safety, . . .

The thickness of the glazing panel 11 is set according to requirements of applications.

As shown in FIGS. 1-5, according to the invention, said apparatus comprising a fixing frame 101 having a fixing frame plane, FFplane, defined by a longitudinal axis X and a transversal axis Y.

Said FFplane is substantially parallel to the surface 12 of said glazing panel 11. In some embodiments, said glazing panel can be curved. FFplane is substantially parallel to tangent surface of said surface 12.

The apparatus 100 further comprises a functional device 102. This functional device is configured to modify at least one surface of said glazing panel. Said surface can be covered at least partially by a wet coating such as paint by this device. Said surface is an interface of said glazing panel and can have a coating system and the functional device is configured to modify said applied on said interface of the glazing panel.

The apparatus 100 further comprises at least a first motor 103 configured to move said functional device in a first direction essentially parallel to FFplane, and at least a second motor 104 configured to move said functional device in a second direction that is orthogonal to said first direction and essentially parallel to Ffplane.

The displacements of this transversal profile FFplane are controlled by two motors 103, 104 operating a pulley or a cog and disposed on a first extremity of each horizontal profile. These motors are synchronized. The other extremity of each horizontal profile supports a pulley or a cog. A belt, a rope or a chain mounted on each horizontal profile is stretched around the pulleys or the cogs of each extremity of the profiles. With the control of the motors, each belt, rope or chain rotates around the two pulleys or cogs, inducing the displacements in the X direction of the transversal profile.

The transversal profile supports a robot head movable in the Y direction relative to the transversal profile. The displacements of this robot head are obtained by a motor with a similar system comprising belt/rope/chain and pulley/cog.

In the embodiment of FIG. 1, using the motors 102, 103, the robot head is then movable in the X and Y directions. Alternatively, the robot head could be movable in the X and Y directions with one horizontal profile mounted over two transversal profiles.

Even if the first interface where the apparatus is detachably fixed on presents some default of evenness or a curved shape, the horizontal profiles are placed at a sufficient distance from the suction means 300 to obtain almost a plane parallel to FFplane for the displacements.

Said fixing frame can comprises a fix part 111, 112 and at least one rail 113 where the functional device 102 is attached on. First motor moves said rail and the second motor move said functional device along said rail. Said rail can move on a second rail 112.

In FIG. 1, said fix part 111, 112 of the fixing frame 101 can comprises an upper beam 111 and lower beam 112, on these beams two rails 101 are firmly fixed are placed substantially parallel each other's to form a rectangular shape in 2D with beams. The first rail 113 is placed on said two rails 101 in order to move along these rails in X direction. The functional device 102 is placed on the rail 113 and move along this rail in Y direction. In this manner, the functional device can move in a plan parallel to FFplane with synchronized motors.

Figure 6:
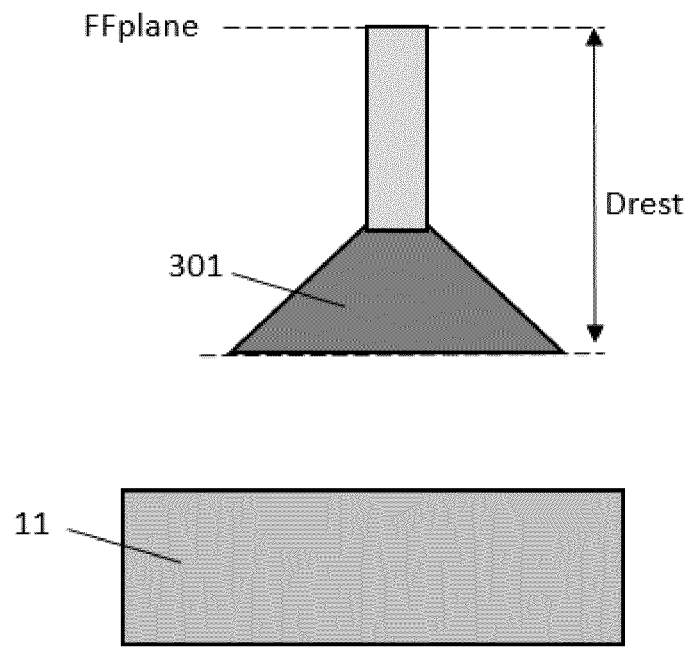
FIGS. 6-8 are schematic of a suction means according to an exemplifying embodiment of the present invention.
Figure 7:
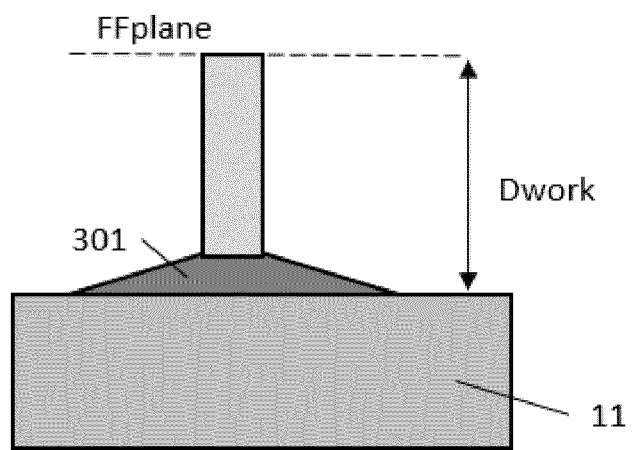
Figure 8:
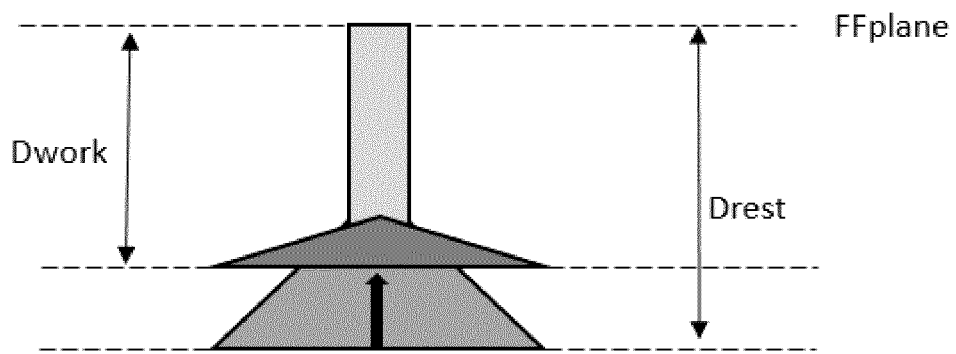

The apparatus further comprises at least N suction means 300, wherein N is a positive integer (N>0), comprising a suction end 301, detachably fixed to said glazing panel, as shown in FIGS. 6-8, defining a resting distance, Drest, between the FFplane and the suction end, measured in the direction normal to FFPlane, when said apparatus is not fixed to said glazing panel 11 and defining a working distance, Dwork, between the FFplane and the suction end, measured in the direction normal to FFPlane, when said apparatus is detachably fixed to said glazing panel 11.

As shown in FIG. 1, the apparatus 100 comprises 4 suctions means 300 (N=4). One suctions means are placed in near each corner of the apparatus and definition a working zone 13 on the glazing panel.

Figure 5:
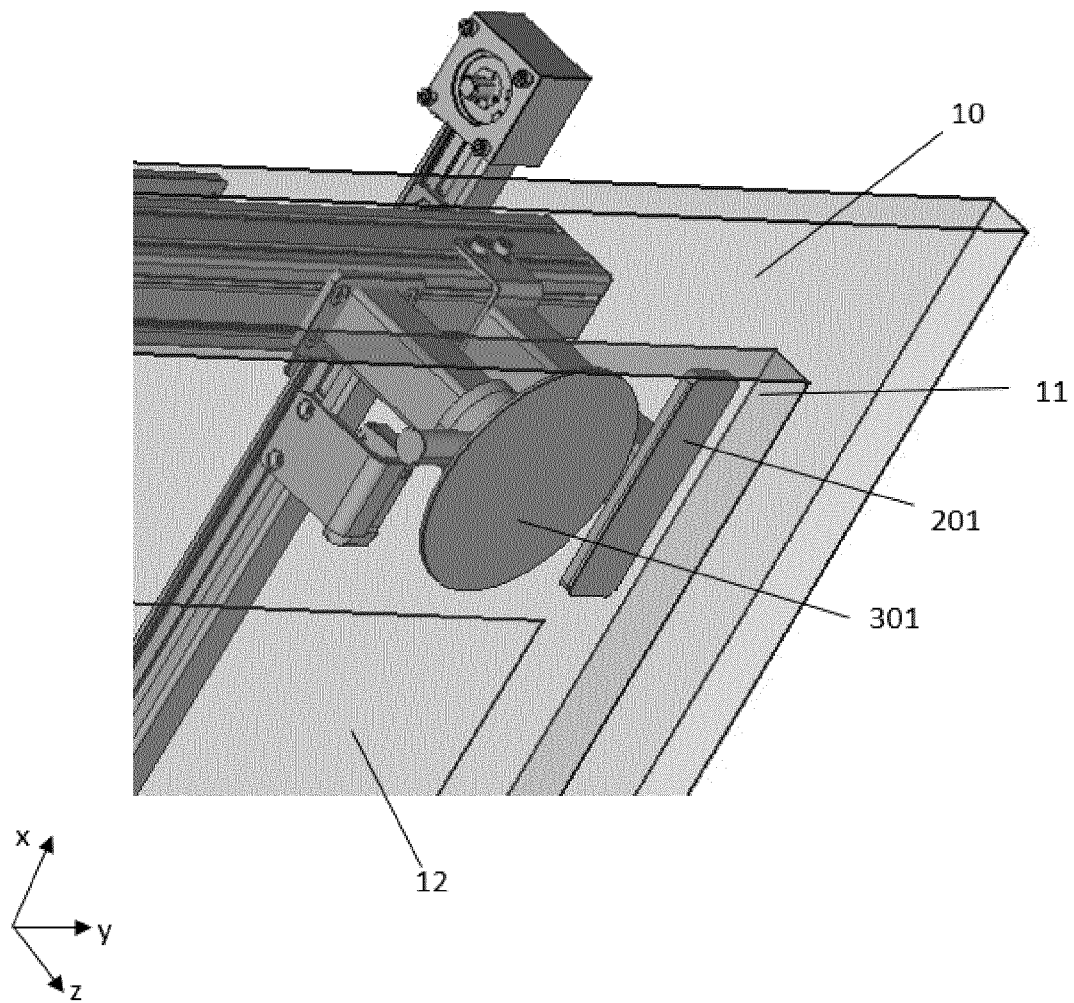
FIG. 5 is a schematic 3D view from the back side of an apparatus detachably fixed on a glazing panel mounted on a stationary object according to an exemplifying embodiment of the present invention.

In some embodiments according to the invention, a single suction means can replace several suctions means. Suctions means can have a circular contact area as shown in FIG. 5 or any other shape such as oblong shape. In case of a non-circular suction end, preferably, the longest dimension of the contact surface is in Y direction.

Figure 9:
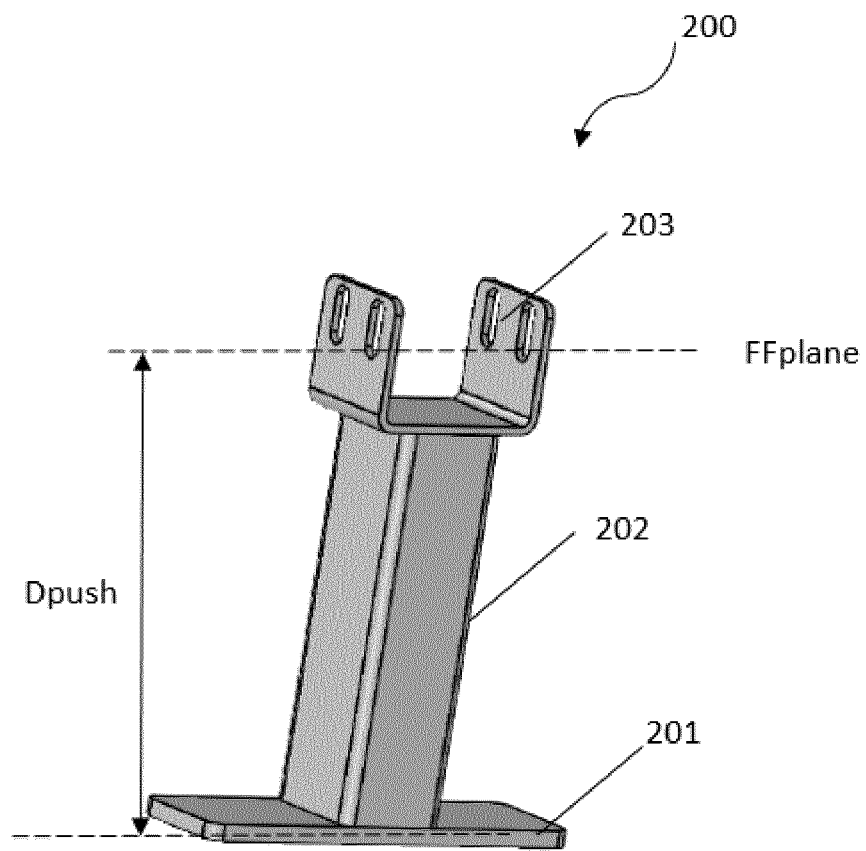
FIG. 9 is a schematic 3D view of a rigid pushing means according to an exemplifying embodiment of the present invention.

The apparatus further comprises at least M rigid pushing means (200), wherein M is a positive integer (M>0), comprising a pushing end (201) defining a pushing distance, Dpush, as shown in FIG. 9, between the FFplane and the pushing end, measured in the direction normal to FFPlane.

As shown in FIG. 1, the apparatus 100 comprises 4 rigid pushing means 200 (M=4). One rigid pushing means are placed in near each corner of the apparatus.

In some embodiments according to the invention, a rigid pushing means can replace several rigid pushing means. Rigid pushing means can have any contact shape area in order to stabilize the apparatus. As shown in FIG. 5, rigid pushing means has a pushing end 201 in form of a base. The longest dimension is in X axis. Pushing ends can have any shape. In some embodiments, pushing ends can be fingers. In case of two fingers, the distance is measured in X axis and are in the same Y. In order to avoid scratches or damaged of the surface of said glazing panel where the apparatus is detachably fixed on, a soft material configured to be in contact with said glazing panel can be added to the pushing end. This soft material is at most of 3 mm and is chosen to avoid shear forces between the apparatus and said surface. Soft material can be a rubber based material of 2 mm. Preferably, the soft material has hardness of at least 70 Shores and more preferably more than 90 Shores.

The sum of the positive integers M and N is equal to or greater than 3 (M+N≥3). The sum, in FIG. 1, is 8 and Dpush is equal to or greater than Dwork (Dpush≥Dwork).

As shown in FIGS. 6-8, suction means comprises a suction end 301

As shown in FIG. 9, rigid pushing means 200 can comprises a pushing end 201 a shaft 202 and a fixing means 203 to fix the rigid pushing means to the frame defining a resting distance, Drest, between the FFplane and the suction end, measured in the direction normal to FFPlane, when said apparatus is not fixed to said glazing panel and defining a working distance, Dwork, between the FFplane and the suction end, measured in the direction normal to FFPlane, when said apparatus is detachably fixed to said glazing panel. Drest is measured between FFplane and the end of the suction means when the suction means is in rest meaning without any force applied on the suction end. Dwork is measured between FFplane and the end of the suction means when the suction means is in working position when suction forces are applied between suction end and an element such as glazing panel in the maximum position to ensure suctions forces.

Said pushing distance Dpush≥Dwork+xpl(Drest−Dwork) wherein 0.1≤xpl≤0.5 and said pushing distance Dpush≥Dwork+xpl(Drest−Dwork) wherein 0.1≤xpl≤0.5. Preferably, xpl and xpu are around 0.4 meaning that Dpush is near the middle of the range between Drest and Dwork.

The base of the pushing end can have dimension such as 150 mm×40 mm.

Rigid pushing means can be made of metal such as Steel, stainless steel, aluminum, a polymer such as aluminum reinforced polymer, or any other material able to have a rigid connection between the glass panel and the apparatus. The term rigid is understood as a pushing means with very limited flexibility and a very high bending stiffness. Preferably, the Young modulus is upper than 70 GPa.

To mount said apparatus to said glazing panel, vacuum pads is placed against one surface of said glazing panel to have a distance between FFplane and said surface substantially equals to Drest. Then, air is sucked from the vacuum pads. During this step, suctions means sucks glazing panel and a force of suction is applied on said surface. This force is in −Z direction (from the glazing panel to the apparatus) and rigid fixing means touch said surface of said glazing panel and then a pushing force occurs between said rigid fixing means and said surface creating a pushing force in the opposite direction of the suction force because Dpush is greater than Dwork.

Suctions means are detachably fixed to the glazing panel because the suction end can be detached from the glazing panel by applying air between said suction end and said surface.

To facilitate the mounting and the handling, the apparatus can comprises several parts such as an upper beam with some suction means and rigid pushing means, a lower beam, rails, functional device and motors. In this case, the upper beam is placed in a first step against the surface of the glazing panel via suction means. Then air is sucked from the vacuum pads. During this step, suctions means sucks glazing panel and a force of suction is applied on said surface. This force is in −Z direction (from the glazing panel to the apparatus) and rigid fixing means touch said surface of said glazing panel and then a pushing force occurs between said rigid fixing means and said surface creating a pushing force in the opposite direction of the suction force because Dpush is greater than Dwork.

After that, others parts of the frame are mounted together and if needed other suction means are detachably fixed to said surface and other pushing means are used. Then the rails, motors and functional device are mounted on.

In some embodiments, a coating system (not shown) is applied to the glazing panel 11 to transform it to a low-E glazing panel. This metal-based coating system such as low-E or heatable coating systems.

In some embodiment, the coating system can be a heatable coating applied on the glazing unit to add a defrosting and/or a demisting function for example.

The coating system can be a functional coating in order to heat the surface of the glazing panel, to reduce the accumulation of heat in the interior of a building or vehicle or to keep the heat inside during cold periods for example. Although coating system are thin and mainly transparent to eyes.

The coating system can be made of layers of different materials and at least one of this layer is electrically conductive. The coating system is electrically conductive over the majority of one major surface of the glazing panel.

As the coating system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

Preferably, the coating system is placed on the majority of one surface of the glazing unit and more preferably on the whole used surface of the glazing panel.

In some embodiments, a masking element, such as an enamel layer, can be add on a part of the periphery of the glazing unit.

In some embodiments, the glass panel comprises several glass sheets, different or same coating system can be placed on different surface of different glass sheets. Preferably, every coating system has at least one frequencies selective surface and more preferably, every of same at least one frequencies selective surface are in front of each other.

Low in reflectance for RF radiation means that RF radiation are mostly transmitted through the material where high in reflectance for RF radiation means that RF radiation are mostly reflected on the surface of the material and/or absorbed by the material and the attenuation is at level of 20 decibels (dB) or more. Low in reflectance means an attenuation at level of 10 decibels (dB) or less. The coating system which is high in reflectance for RF radiation means that the coating system is non-transmitting to RF radiation.

The coating system of the present invention has an emissivity of not more than 0.4, preferably less than 0.2, in particular less than 0.1, less than 0.05 or even less than 0.04. The coating system of the present invention may comprise a metal based low emissive coating system; these coatings typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometres, mostly about 5 to 20 nm. Concerning the dielectric layers, they are transparent and traditionally each dielectric layer is made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

A simple approach to this problem of RF energy reflection is to remove a portion of the coating system to avoid to have a high reflectance for RF radiation. This approach, however, reduces the solar control benefits offered by the glazing unit and for equipment located inside the building, the vehicle or the car, the region would be unacceptably large. On top of that, the transition between the decoated portion and the coating itself is eye-visible and usually non-accepted by users.

Another solution has been to cut lines in the coating system to create a surface which is frequency selective, that is, it has relatively high reflectivity/absorbance for solar energy but relatively low in the RF region of the electromagnetic spectrum. The cutting may be performed by laser ablation and the spacing of the slits is chosen to provide selectivity at the desired frequency.

In order to correctly decoat a coating system, the laser source of the decoating means must be precisely focused onto the targeted coating system. To this end, the position of the coating system must be known with a precision at least three times smaller than the depth of field of the decoating means. The depth of field corresponds to a distance around the focal point of a focused laser beam where the laser beam diameter is considered constant. This distance depends a lot on the laser beam characteristics and the optics used for focusing said laser beam. Typically, the depth of field is around 0.5 mm, which means that the precision on the focus position of the said decoating means should be around 0.1-0.2 mm.

Considering the variable distance between the support structure and the windows and the required precision, the invention proposes to move the decoating means before the decoating process to focus the laser on the coating system.

Thus, the power of the laser can be limited to the required power to decoat the coating system and the risk of degradation of the other part of the multi-glazed windows is limited.

To solve these issues, the functional device (102) is a decoating means with a laser source configured to modify at least one coating system applied on an interface of the glazing panel. Thanks to rigid pushing means 200, the apparatus is stable on the glazing panel. On top of that, the motors cause movements and jerks which generate a displacement of said apparatus. This displacement decreases the precision of laser decoating lines but also of the position of the focal on the coating system.

The invention claimed is:

1. An apparatus configured to be detachably fixed on a glazing panel mounted on a stationary object or on a mobile object, the apparatus comprising:
    a fixing frame having a fixing frame plane, FFplane, defined by a longitudinal axis X and a transversal axis Y,
    a light emission element,
    at least a first motor configured to move the light emission element in a first direction essentially parallel to FFplane,
    at least a second motor configured to move the light emission element in a second direction that is orthogonal to the first direction and essentially parallel to FFplane,
    wherein the apparatus further comprises:
        at least N suction means, wherein N is a positive integer (N>0), comprising:
            a suction end, detachably fixed to the glazing panel, defining a resting distance, Drest, between the FFplane and the suction end, measured in a direction normal to FFplane, when the apparatus is not fixed to the glazing panel, also defining a working distance, Dwork, between the FFplane and the suction end, measured in the direction normal to FFPlane, when the said apparatus is detachably fixed to the glazing panel;
        at least M rigid pushing means, wherein M is a positive integer (M>0), comprising:
            a pushing end defining a pushing distance, Dpush, between the FFplane and the pushing end, measured in the direction normal to FFPlane;
    wherein a sum of the positive integers M and N is equal to or greater than 3 (M+N≥3) and wherein Dpush is equal to or greater than Dwork (Dpush≥Dwork).

2. The apparatus according to claim 1, wherein Dpush ≥Dwork+xpl(Drest−Dwork), wherein 0.1≤xpl≤0.5.

3. The apparatus according to claim 1, wherein Dpush ≤Drest−xpu(Drest−Dwork), wherein 0.1≤xpu≤0.5.

4. The apparatus according to claim 1, wherein the light emission element is part of a decoating means configured to modify at least one of a coating system applied on an interface of the glazing panel.

5. The apparatus according to claim 1, wherein the suction end is a vacuum pad or a suction cup.

6. The apparatus according to claim 1, wherein the fixing frame comprises at least a first rail and a second rail, the first rail allowing for the light emission element to move in the first direction, and the second rail allowing for the light emission element to move in the second direction.

7. The apparatus according to claim 1, wherein the pushing end comprises a soft material configured to be in contact with the glazing panel.

8. The apparatus according to claim 1, wherein the pushing end comprises at least two fingers configured to be in contact with the glazing panel.

9. The apparatus according to claim 1, wherein the pushing end is a base.

10. A method to mount the apparatus according to claim 1 on the glazing panel of the stationary object or on the mobile object, the method comprising:
    placing the suction end of the at least one suction means against a surface of the glazing panel to have a distance between FFplane and the surface substantially equal to Drest,
    fixing detachably the suction end to the surface of the glazing panel,
    wherein during the fixing, pushing the suction end to touch the glazing panel, and pushing the glazing panel to have Dpush equals to or greater than Dwork (Dpush-≥Dwork).

11. The apparatus according to claim 1, wherein the light emission element comprises a laser.

12. The apparatus according to claim 1, wherein the glazing comprises a glass sheet.

13. The apparatus according to claim 1, wherein the glazing comprises a coating system.

* * * * *